UNITED STATES PATENT OFFICE.

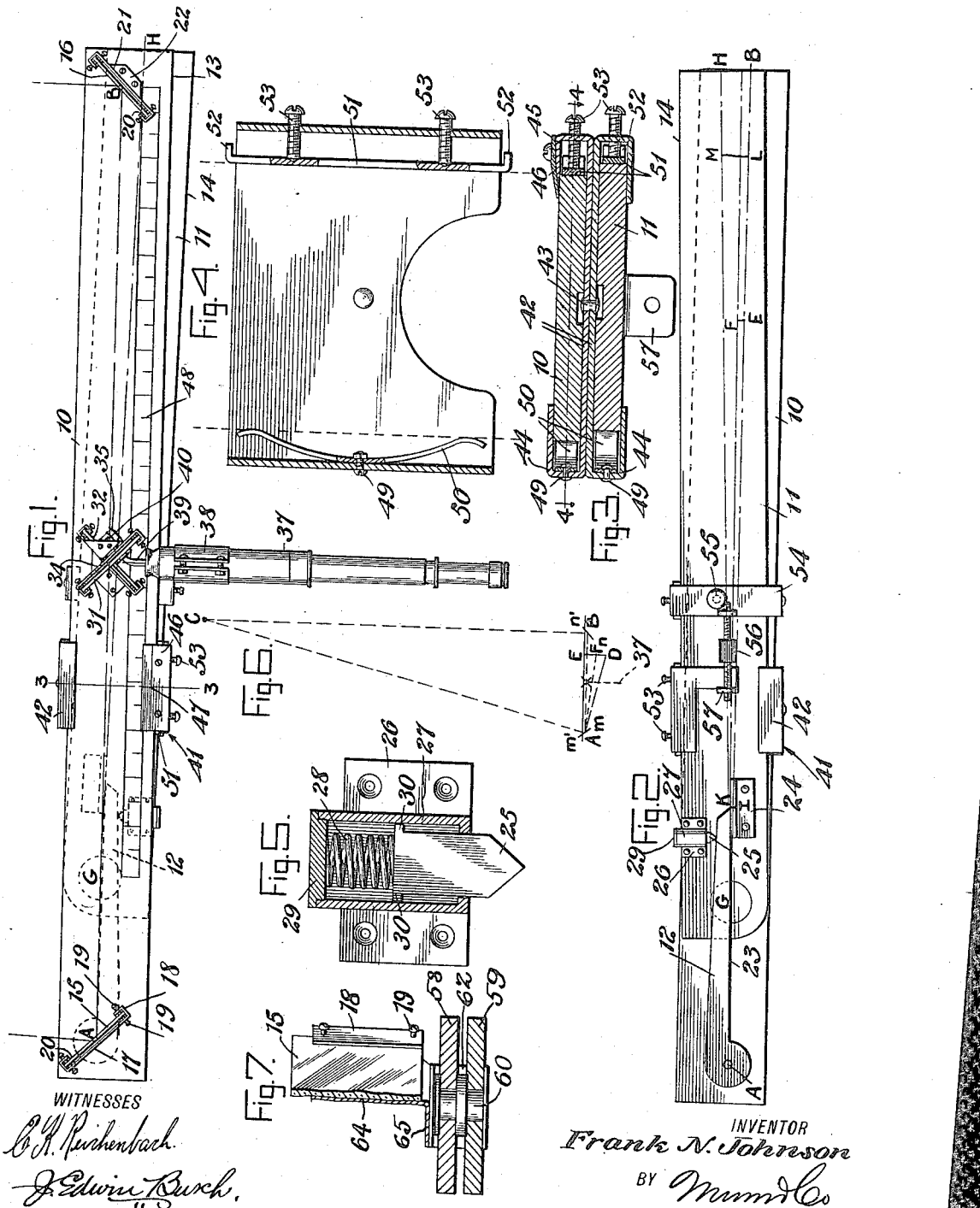

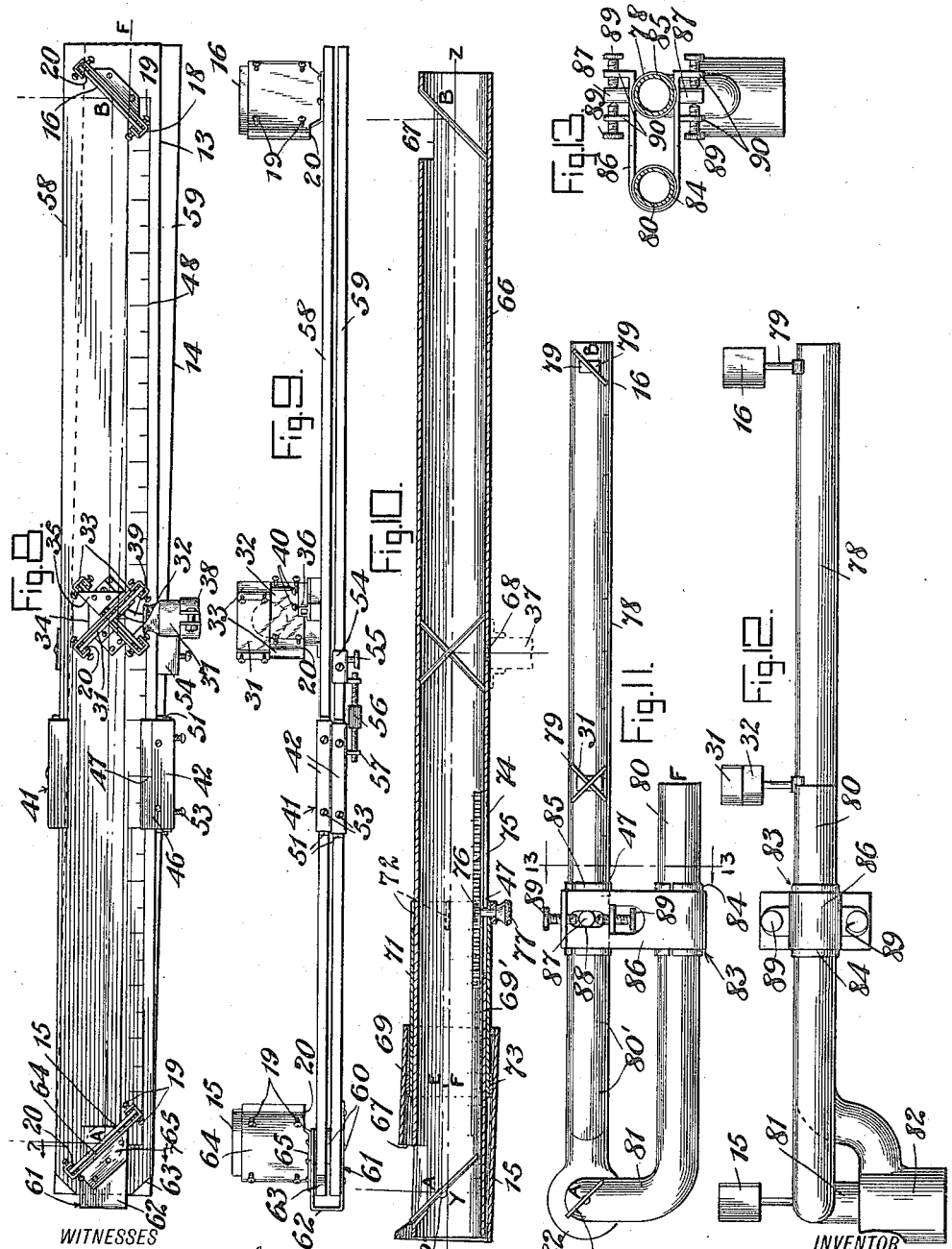

FRANK N. JOHNSON, OF HOLLY GROVE, ARKANSAS.

TELEMETER.

1,215,162.

Specification of Letters Patent.

Patented Feb. 6, 1917.

Application filed October 29, 1914. Serial No. 869,251.

*To all whom it may concern:*

Be it known that I, FRANK N. JOHNSON, a citizen of the United States, and a resident of Holly Grove, in the county of Monroe and State of Arkansas, have invented a new and Improved Telemeter, of which the following is a full, clear, and exact description.

This invention comprehends the provision of an improved telemeter or means for measuring distances and particularly those of considerable magnitude with accuracy and precision.

The primary object of the invention is comprehended by the provision of an instrument of the character named for making linear or distance measurements which permits the use of various optical systems or systems of light reflection in such a manner that when two images, either partial or total, are reflected by means of mirrors or prisms into a telescope, sighting instrument, or directly into the eye and brought into coincidence to produce a clear image of the object viewed monocularly or otherwise, triangles will be erected with a properly calibrated part of the instrument and with the object viewed in such a manner as to establish a ratio permitting accurate determination of the distance to be measured.

Another and important object of the invention is comprehended in the provision of an improvement in telemeters in which a portion of the instrument suitably calibrated forms the base of a triangle with the object viewed so that by varying the angle of divergence between two parts of the instrument, of which the base is one, and marking off on the base a distance calculated to approximate that of the distance from the telescope, sighting instrument or eye, a coincidence of reflection is then effected by sighting through the telescope or sighting instrument by adjustment of the parts of the instrument to form the proper angle between the two, and such distances may be quickly and accurately read without necessitating complicated and lengthy calculations.

A still further and important object of the invention is to provide an instrument of the character named which is adapted for use in making linear measurements in such a manner that the advantage of a long base consistent with convenient manipulation of the instrument is provided, in which a minimum absorption of the reflected rays is acquired to secure the proper coincidence of the reflected rays, and to provide for the use of the underlying principles and structural features in connection with an apparatus designed for use as a range finder for military purposes, as a surveyor's instrument in triangulation or generally as a distance gage without departing from the spirit of the invention, as well as provide for such calculations that due to the fact that functions in small angles vary as their arcs, the error introduced by this assumption is rendered almost negligible and the accuracy of the instrument thereby assured.

With the above and other objects in view, the invention resides in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views, and in which—

Figure 1 is a plan view of a telemeter construction constituting the preferred form of my invention;

Fig. 2 is a bottom view thereof with the telescope or sighting instrument omitted;

Fig. 3 is a cross sectional view taken on the line 3—3 of Fig. 1 and enlarged relative thereto;

Fig. 4 is a sectional view taken on the line 4—4 of Fig. 3;

Fig. 5 is an enlarged detail sectional view of a spring acting member used with the device illustrated in Figs. 1 and 2;

Fig. 6 is a diagrammatic view illustrating the method of calculating in accordance with the principles of the invention;

Fig. 7 is a sectional view taken on the line 7—7 of Fig. 8;

Fig. 8 is a plan view of a further modified form of the apparatus;

Fig. 9 is a rear edge view thereof;

Fig. 10 is a longitudinal sectional view partly in elevation of a still further modified form of the invention;

Fig. 11 is a plan view of another form of the invention;

Fig. 12 is a rear edge view thereof.

Fig. 13 is a sectional view taken on the line 13—13 of Fig. 11.

In carrying my invention into practice and illustrating the principles involved in the measurement and calculation of distances, in Figs. 1 to 5, inclusive, I have illustrated the preferred form of the invention which comprises an upper long arm 10 to which is pivoted a lower short arm 11 at a point distant or remote from one end of the arm 10, while also pivoted to the arm 10 is an auxiliary arm 12, the auxiliary arm being pivoted to the arm 10 at a point less remote from its end at A on a line of the long axis of the arm 10 indicated by the line A—B. The arm 11 is pivoted at the point G on a line of the axis of the arm 10 so that said arms, including the auxiliary arm, are adapted to swing by each other or on horizontal planes. The longitudinal edges 13 and 14 of the arms 10 and 11 while not necessarily perfectly straight must be approximately even or in alinement when the axes of the arms are parallel, that is, they must lie in the same surface, or nearly so, parallel to the axis of a revolving reflector 15 which is fixed to the auxiliary arm 12 to move or pivot therewith at 45° to the long axis A—K thereof, while a reflector 16 is fixed to the arm 10 at its opposite end at an angle of 45° to the axial line A—B relative to which the reflector 15 is adjustable.

In order to support the reflector 15 a holder 17 is provided, the same having angular channel-forming end portions 18 receiving the reflectors or mirrors therein for angular adjustment by set screws 19 operating through the opposed portions of the holder near the top and bottom thereof at each end so as to accurately adjust the reflector at the proper angle while the reflector is supported upon inturned ends 20 at the bottom of the holder. The holder for the reflector 16 is indicated by the numeral 21 and is similar in construction to the holder 17 with the exception that instead of being attached to the pivot connecting the arms 10 and 12 and moving with the latter, it is provided with an attaching portion 22 removably fixed to the arm 10 by screws or otherwise so as to remain rigid therewith at an angle of 45° to the axial line A—B constituting the long axis of the arm 10.

In a simpler form of my invention hereinafter described and illustrated by Figs. 8 and 9, the arm 11 is pivoted to arm 10 at A, and reflector 15 is rigidly fixed thereto to move or pivot therewith through the same arc as that described by arm 11 when moved with reference to arm 10, but because, as will be shown hereinafter, the invention involves the determining the length from the pivot A to a certain constant offset maintained between the axes of the arms pivoting at A, and this said length in turn is found by scaling the length between the pivot and a constant offset maintained between the edges of the arms; and because the angle of divergence between the axes of the arms or edges of the arms is usually minute, in this simpler form of the invention the edges of the arms, while not necessarily perfectly straight, should be even or symmetrical with respect to the axes. Extreme accuracy with this respect is necessary, but such accuracy is difficult of accomplishment. The difficulty is overcome in the first mentioned or preferred form of the invention by the introduction of a mechanical contrivance of which the auxiliary arm 12 forms a part. The edges of the arms are made parallel to their axes, including the edge 23 of the auxiliary arm, so that by the pivotal connection of the parts the axes of the long arms and of the revolving reflector 15 and edge 23 of the auxiliary arm 12 can be brought into the same plane; then if arm 11 be rotated through an angle, arm 12 and the revolving reflector will be rotated through a smaller angle, the free extremity K of the auxiliary arm 12 being kept always at a point in the long axis G—H of arm 11, the angles and their functions, if small, bearing a constant ratio as will be hereinafter shown and errors due to inaccuracy of the edges will be decreased by this ratio. To assist in this the extremity of the auxiliary arm 12 from the point A to the point K is normally kept in contact with a straight edge formed by the horizontal member of an angular plate 24 fixed to the arm 11 beyond the pivot G. The straight edge is in the axis G—H of the arm 11, and the extremity K of the auxiliary arm is maintained at all times in contact with the straight edge as by means of a spring pressed detent 25. This detent is secured to the arm 11 at the opposite side of the auxiliary arm relative to which the straight edge 24 is secured and comprises an attaching plate 26 with a barrel 27 receiving the detent therein to be acted on by an expansible coiled spring 28 held in position by a plug 29 to force the detent outwardly, while the detent is provided with projections 30 to engage the opposite end of the barrel and prevent its displacement.

In one system of light reflection employed in this invention, a pair of reflectors or mirrors 31 and 32 are supported intermediately of the length of the instrument on the arm 10 or centrally of its long and short axes, the mirror 31 facing the mirror 15 but facing rearwardly instead of forwardly and being disposed at an angle of 45° to the short and long axes of the arm, while the mirror 32 faces the mirror 16 and is otherwise similarly located except that the mirror 31 is supported above the mirror 32, or vice versa. These mirrors are supported in holders 33 similar in construction to the aforesaid holders except that they are one-half the height thereof and are secured in the arm 10 by an attaching part 34, while the respective holders are secured to each other by overlapping wings 35, all of said connections being detachable.

The attaching part 34 carries a squared socket member or sleeve 36 permitting removable attachment and adjustment of a telescope or sighting instrument 37 toward or away from the mirrors or reflectors 31 and 32 and with respect to the line of intersection thereof, as by means of a clamp 38 removably attached to the telescope and provided with a downwardly offset and angularly bent shank 39 which engages the socket member or sleeve and is capable of adjustment therein by set screws 40. In this manner the rays of light from a distant point, as the point C in Fig. 6, through the mirrors 15 and 16 at the points A and B, can be brought into coincidence due to the interception of the rays of light reflected, by the mirrors 31 and 32 so that the upper half of the rays are received on one mirror and the lower half on the other mirror in the form of partial images which, when brought into coincidence by adjustment of the arms one relative to the other in a manner to be hereinafter more fully described, and after the telescope or sighting instrument has been so placed that the line of collimation therethrough is properly regulated, will unite and form one image when viewed monocularly.

In order to angularly adjust the arms one with respect to the other and angularly move the mirrors to secure the proper coincidence of the reflected rays or partial images, a slide 41 engages the two arms, said slide preferably comprising a pair of plates 42 pivotally connected as shown at 43 in the centers of the plates particularly with respect to their transverse dimension, so that when the arms and the axes thereof are in alinement the pivot will be disposed in the plane of the axes of the arms but may be adjusted to remain in the plane of the axis G—H of the arm 11. For this purpose the opposite edges of the plates are bent in angular directions, as shown at 44, said edges being first extended upwardly and downwardly and then inwardly to overlie the bottom face of the arm 11 and the upper face of the arm 10, while the portion 45 extends just slightly over the face of the arm 10 and carries a removable plate 46 which is marked or scratched at its center as shown at 47 to provide an indicator or zero of a vernier which co-acts with a properly graduated scale 48 longitudinally of the arm 10 adjacent to the edge at which the vernier is disposed.

Removably secured to the angular ends of the plates 42, as shown at 49, are leaf springs 50 the same being attached to the plates at their central portions and having their free ends acting against the edges of the arms 10 and 11 with equal tension to normally move the arms into alinement vertically, while mounted in the opposed portions of the plates are removable clamping jaws 51 each having out-turned end portions 52 to prevent displacement thereof and being acted on by a pair of screws 53 so that by adjusting the screws against the action of the springs, the arms may be adjusted or moved out of alinement the proper distance constituting the deflection or variation of the position of one arm relative to the other in order to bring about a coincidence between images when viewed through the sighting instrument. The adjustment is made slight and the adjusting device slid longitudinally of the arms to increase the deflection of one arm with relation to the other, the plates being free to revolve on the pivot as the pivot remains in the axis G—H of the arm 11 and moves out of the axis A—B of the arm 10. It thus appears that the sections are pivoted to move relatively so that the shifting of the slide when adjusted in the manner described operates to move one section on the other to automatically erect an angle or triangle on one of the legs of the triangle or base formed by the graduated arm and the distance set off forms the other side or leg of the triangle.

In order to facilitate the adjustment of the plate on the arms to secure more accurate adjustment, a micrometer is provided, the same consisting of a second slide 54 which is slidable on the lower section or arm 11 and adapted to be adjustably secured thereto by a set screw 55, while an oppositely threaded adjusting bolt 56 connects the slide 54 to a depending portion 57 of the slide comprised by the plates 42. In this manner the bolt may be turned for the purpose of shifting the slides in opposite directions simultaneously while the set screw 55 is loose or when said set screw is acting to hold the slide 54 against movement on the arm 11 the adjusting slide will be shifted on the arm relative to the slide 54 so that the adjustment or movements of the parts can be regulated to a nicety. The scale 48 is placed or fixed parallel to the axis A—B of the arm 10 with its zero mark in alinement and at right angles opposite to the pivot point G in the axis A—B so it is evident that for any position of the slide the distance from G, as G—L in Fig. 2, to the normal dropped from the rivet to the axis of the arm, as L—M in Fig. 2, is equal to the distance from zero to the mark or indicator 47, this distance being equal to A—E in Fig. 6.

As the extremity K of the auxiliary arm 12 is kept always in the axis G—H of the arm 11, if the angle B—G—H be a small angle, we may presume the length G—K to be constant. In the form of the invention shown in Figs. 1 and 2, the angle formed by the arm 11 and the auxiliary arm 12 bear a constant ratio, this ratio being $\frac{IA}{IG}$. In Fig. 2, I indicates the point of contact of the extremity K of the auxiliary arm 12 with the straight edge 24, E—F indicates a line erected normal to A—B at a point E, F lying in the axis of A—K produced and M lying in the axis G—H. G—L in Fig. 2 is equal to A—E and L—M equals E—F multiplied by the ratio $\frac{IA}{IG}$. It will be shown in discussing the simpler form of the invention hereinbefore referred to and illustrated in Fig. 8, that if a scale be placed on arm 10 parallel to the axis A—B, with its zero mark in alinement and at right angles opposite to the pivot point A in axis A—B, and a slide adjusted to separate the lower edges of the arms by a distance E—F equal to one half the base line A—B times the ratio of a scale division to the unit of measure used, and coincidence of images then effected by moving the indicator 47 of the slide to any point F, the distance to the object viewed can be read on the scale opposite this indicator. Therefore, remembering that L G is always equal to E A and L M equal to E F times a ratio, if with this preferred type of instrument a scale be placed as specified, with its zero opposite pivot point G and the slide adjusted to separate the lower edges of the arms by a distance equal to one-half the base line times the ratio of a scale division to the unit of measure used times the ratio $\frac{IA}{IG}$, and coincidence of images then effected, the distance to the object viewed can be read on the scale opposite to the mark 47.

Errors due to slight inaccuracies of the edges will be decreased by the ratio by $\frac{IA}{IG}$, the use of the third or auxiliary arm arrangement. This ratio can be fairly large so that if a distance of 50' be read, using a 5' telemeter equipped with this auxiliary arm, the ratio $\frac{IA}{IG}$ being 5, the error resulting from this use will be less than 0.32' and if the distance be great the error will be negligible.

In Fig. 6, which illustrates the method of calculating. A—B represents the base line of the instrument, with a mirror n—n' fixed at B at 45° to A—B, and a mirror m—m' pivoted at A fixed at an angle of 45° to A—F. C indicates the distant object. A—B—C and D—E—A are similar triangles having constant bases A—B and D—E. The variable B—C equals the variable A—E times constant of the instrument, the constant being $\frac{AB}{ED}$. A—B being the base of the triangle A—B—C and E—D the base of the triangle D—E—A and corresponding to the offset of the instument.

As shown in this figure the line A—D is normal or perpendicular to A—C, D—E drawn through F is normal or perpendicular to A—B, and the constant D—E equals 2—E—F.

It is evident that the angle at the target or object equals the angle through which the ray of light is turned at A and this angle is twice the angle through which the mirror at A must be turned.

Further, it is evident that if a scale be placed along A—B to indicate the angular movement of the mirror in terms of distances of which length B—C is required, the distance B—C can be read from the scale. Still, further it is evident that A—B and E—D may be of any length and that therefore any value may be chosen for the ratio and hence any scale divided decimally may be used, the ratio being fixed thereby.

The form of the invention shown in Figs. 8 and 9 of the drawings illustrates a form of mechanical contrivance for carrying out the operation above set forth, and in this form of the invention the structure is the same with the exception that instead of having arms of different lengths as are the arms 10 and 11, and employing an additional or auxiliary arm 12, upper and lower arms 58 and 59 of equal lengths are employed and are pivotally connected as shown at 60 with interposing spacing members. A U-shaped bracket 61 is fixed to the lower arm and receives both arms there-between with its bight portion 62 adjacent to the extremities of the arms which are thus pivotally connected, the upper arm being thus permitted to swing or pivot with respect to the bracket and lower arm and having a rounded end portion 63 permitting a wide range of adjustment. In this case a holder 64 is used in lieu of the holder 17 and is provided with an attaching portion 65 by which it is removably secured rigid with the upper portion of the bracket at an angle of 45° to the axis of the lower arm or of the two arms when the same are in alinement. Due to the fact that the arms are flat or relatively long and thin, they are made of material sufficiently rigid to hold them rectilinear and prevent sagging thereof in the center or they may be stiffened in any preferred manner.

In this instance, the light rays from the same sources C through the mirrors at the points A and B can be brought into coincidence and A—E and E—F of Fig. 6 measured by means of the mirrors arranged in the manner described in connection with Figs. 1 and 2 by receiving the rays reflected by the lower half of one end mirror on one of the central mirrors and the reflected rays of the upper half of the other end mirror on the other central mirror at right angles from said reflecting mirrors, so that a partial image of the object viewed is thereby formed in each of the central mirrors and the two partial images thus formed brought into coincidence by adjusting the arms to move the mirror carried by the holder 64 at the point A, so as to unite and form one image when viewed monocularly as by means of the telescope, sighting instrument or eye direct in the manner described. Furthermore, all the rays from each end mirror can be received by two central mirrors or reflecting prism systems differently arranged from the manner described and viewed binocularly, the two separate and identical images being thus presented one to each eye, when the reflected rays from the end mirrors are brought into coincidence by revolution of the mirror at the point A, so that with a scale fixed parallel to the axis A—B of the arm 58 and having its zero opposite at right angles to the pivot A, it is evident that for any position of the slide the distance from A to the normal drop from the center of the rivet forming the pivot of the slide plates to the axis of the arm is equal to the distance from zero to the graduation or scratch 47, and this distance is A—E of Fig. 6, so that the distance B—C can be conveniently read.

As above explained, the slide is adjusted so that the center of the rivet forming the pivot of the plates is brought to the plane of the axis A—F of the arm 59 by adjustment of the screws 53 and particularly the lower screws, and the center of the pivot being set to a point distant E—F in Fig. 6 from the plane of the axis A—B of the arm 58 by the upper screws, the springs holding the parts in this position, but in order to initially adjust the screws of the slide so that a distance E—F may be set off, some point of known distance is observed and the slide adjusted to bring the mark 47 thereof at the reading of the scale conforming to that distance and then effecting a coincidence by means of the screws of the slide so that any other distance may be obtained by effecting a coincidence of the images by shifting the slide inwardly or outwardly relative to the pivot of the arms and then reading the scale or measurement off set.

Any optical system used in existing telemeters to magnify the objects viewed can be used with these telemeters and in addition with a monocular type of this instrument, instead of placing telescope objectives between the end reflectors and central reflectors, both objective and ocular may be placed beyond the central reflectors as hereinbefore shown, the rays suffering double reflection before entering the telescope. In this case, there are not, as in existing telemeters, two partial images, one superimposed above the other, formed by the two central mirrors, of prism systems, but two complete images of the object viewed, and these images are indistinct and separate until the rays from the end mirrors are brought into coincidence by adjusting the revolving mirror and the images are thereby merged into one clear distinct image. Furthermore, it is evident that one pair of reflectors can be dispensed with in the telemeters above described. Reflectors 16 and 32 may be omitted, the telescope receiving on the one half of its objective reflected rays from the object viewed through reflectors 15 and 31, and on the other half direct rays from the object viewed, the base line being thereby changed; also, in this case, the arms need not extend beyond reflector 31 and the telescope. Furthermore, the length of the long leg of the right triangle formed by the paths of rays from an object to the ends of a base line and then reflected into coincidence with the base line as above described, is determined by scaling the long leg of an auxiliary right triangle, as the triangle A—E—F in Fig. 6, the angle of which included between the long sides is one-half the angle included between the long sides of the first triangle erected by the rays from the object to the arm of the implement as a base. This second triangle is formed by the base line by an arm fixed rigidly to one reflector, as the arm 59, and the slide which separates the arm and the base line by a distance equal to one-half the base line times the ratio of one scale division to the unit of measure of the required distance so that the triangle is automatically erected in effecting coincidence and the scale reading gives the required distance, because, as shown above, the long legs of the triangles bear a constant ratio when the adjacent angles are small.

From the above modification of devices for carrying out or utilizing the principles involved, it will be seen that different arrangements and different designs of arms and slides from that shown and described may be made and used but the principles outlined for the purpose of effecting coincidence and determining distance are the same or essentially so. However, further modifications are shown, as for instance, in Fig. 10, wherein the telemeter is shown as comprising a tube or tubular arm 66 with the reflectors inclosed or incased in a tube near each end thereof and oppositely disposed at angles of 45° to the optical axis of the tube, while the tube is provided with openings 67 producing windows near its ends to admit light to the reflectors, while an eyepiece 68 is provided for the central reflectors, the reflectors constituting a system of reflection or prism system being located in any of the manners heretofore described. The view, which is a longitudinal or median section, is illustrated with the optical axis A—B of the instrument at one side of the axis Y—Z of the tube, parallel to it and distant therefrom a distance equal to one-half the base line times the ratio of a scale division of the scale used, to the unit of measure used. The reflector 15 is rigidly fixed to an outer tube 69 which is of sufficient diameter to allow a space between the tubes and which is pivoted to the inner tube at 70 so that when the tubes are parallel the optical axis A—B coincides or alines with the axis of the outer tube, the reflecting surface revolving about the pivot 70 which lies in the optical axis A—B.

A slide 71 also in the form of a tube and closely fitted to the tube 66 is mounted on the latter and slit, as shown at 72, to avoid undue friction between it and the tube on which it slides. The slide operates in the space between the inner and outer tubes constituting long and short arms of the instrument and carries at its end, close to the pivot 70, a collar 73 consisting of a ring the inner surface of which is cylindrical and which exactly fits the slide, while its outer surface is spherical with a radius corresponding to the radius of the inner surface of the outer tube 69, while the center of said spherical surface is the center of the transverse dimension of the ring. Thus, at any position of the ring the axes of the inner and outer tubes intersect at the center of the ring at the point F because the axis of the inner tube is a locus of the center of the ring and the cylindrical surface of the outer tube is tangential to the spherical surface of the ring about a great circle. In this manner the axis A—F of the outer tube 69, the optical axis A—B and the distance E—F between these axes adjacent to the center of the ring or collar are respectively A—F, A—B and E—F of Fig. 6, hence the distance to the object viewed, coincidence having been effected by moving the slide, may be read on a scale 69' placed on the tube 66 and using the edge of the slide 71 as an indicator. The zero of the scale must be opposite a point on the optical axis distant from the pivot 70 the length of the slide, the length of the slide meaning the distance from the center of the collar to the indicator. In order to move the slide in the structure illustrated the inner tube is slotted, as shown at 74, and carries a rack 75 which is attached longitudinally to the inner face thereof and engaged by a pinion 76 carried at the inner end of a shaft 77 having an exterior grasping portion which is preferably knurled so that the shaft can be turned for rotating the pinion in engagement with the rack to shift the slide on the inner tube to vary the degree of divergence between the inner and outer tubes by shifting the collar.

It is to be understood that when the outer and inner tubes are parallel, the optical axis A—B of the inner tube coincides with the axis A—F of the outer tube, the movable reflector 15 being disposed at an angle of 45° to the optical axis. When the collar 73 is shifted by movement of the slide, the outer tube 69 is tilted so that its axis A—F diverges from the optical axis. As the reflector 15 is fixed to the outer tube 69 when the slide is shifted between the tubes, the reflector is moved about the pivot 70 in order to effect the coincidence of the images, the degree of divergence between the inner and outer tubes being indicated by the scale. Telescope objectives not shown in the illustration may be placed between the end reflectors and the central reflectors, while the eyepiece 68 may carry the occular as commonly done in existing telemeters.

In the form of the invention illustrated in Figs. 11, 12 and 13 of the drawings, the frame of the telemeter is of different construction but embodies or utilizes the same principles as that above described. In this form of the invention the device is shown as comprising a tubular arm 78 constituting the long arm of the instrument or appliance, the same carrying upon supports 79 the usual rigid reflectors while its axis A—B constitutes the base referred to in the above calculations. A short arm 80 is pivoted at one end to the arm 78 and comprises a tube which is bent inward and downward at one extremity, as shown at 81, so that one end thereof fits in a socket 82 at the adjacent end of the arm 78, a line passing through pivot A and parallel to the straight part of arm 80 corresponding to A—F. The arm 80 can thus revolve about the pivot and carries the revolving reflector 15 corresponding to the reflector above described, and when the straight portion of the arm 80 is parallel to the axis A—B of the arm 78, the reflector 15 will be disposed at an angle of 45° to the axis A—B, the axis of the arms being always disposed in the same horizontal plane.

A slide 83 is mounted on the arms and comprises a pair of tubes 84 and 85 which are preferably slit to avoid undue friction, and to the tube or sleeve 84 a U-shaped plate 86 is fixed, the plate being bent around the sleeve and extending tangentially to and beyond the sleeve 85. To this plate the sleeve 85 is pivoted above and below its vertical axis, the pivots 87 thereof extending through elongated openings 88 in the plate and being held in position by adjusting screws 89 operating in opposite directions through angular portions 90 of or carried by the plate. By these screws a distance equal to one-half the base line times the ratio of the scale division of the scale used to the unit of measure used may be maintained between the axis A—B of the arm 78 and a line passing through said axis at a point A constituting the pivot and parallel or otherwise with respect to the arm 80, the line passed and the distance between the same are respectively A—B, A—F and E—F of Fig. 6, so that the distance of the object viewed can be read on a scale as above, the scale 80' being placed on the tubular arm 78 using an edge of the sleeve as an indicator with the zero of the scale placed ahead or back of the point A, depending upon which edge is used as an indiactor, by a distance equal to one-half the length of the sleeve.

The form of the invention illustrated in Figs. 1 to 8 and 11 to 12 are adapted particularly for engineering work or surveying, while the form of the invention shown in Fig. 10 is adapted particularly for naval and military uses, although there is no restriction to this particular use and all forms may be used for the different purposes. In all existing telemeters two telescope objectives are used, being placed between the end reflectors and the central reflectors, while a telescope eyepiece or occular is placed entirely without the reflecting system. Two magnified partial images of the object viewed are thereby received by the eye, the upper portions being reflected by the upper reflector and the lower portions by the lower reflector. Coincidence is determined by making the upper partial image coincide with the lower partial image along a horizontal line in the center of the field of view. Thus, in looking at a tree, if the instrument be not adjusted, the lower part of the tree would be seen to the right or left of the upper part. From the foregoing description it is thought that the principles and operation of the device will readily appear and that further description will be unnecessary.

Having thus described my invention, what I claim as new and desire to secure by Letters Patent is:—

1. In a telemeter, an arm constituting a side of a triangle formed with the object, a second arm pivoted to the first arm, an auxiliary arm also pivoted to the first arm, a system of light reflection embodying reflecting members carried by the first arm and the auxiliary arm, the reflecting member carried by the auxiliary arm being adjustable with said arm to secure coincidence of the images of the object viewed, and means for angularly adjusting the second arm relative to the first arm at a given ratio, the said second arm controlling the adjustment of said auxiliary arm and the reflecting member carried thereby, whereby the distance to the object viewed can be ascertained.

2. A device for ascertaining the distance between a point and an object viewed, comprising an arm constituting a side of a triangle formed with the object, a second arm pivoted to the first arm and adjustable relatively thereto at a given ratio, an auxiliary arm also pivoted to the first arm, a system of light reflection embodying reflecting members carried by the first arm and the auxiliary arm, the reflecting member carried by the auxiliary arm being adjustable with said arm to secure coincidence of the images of the object viewed, a slide cooperating with the first and second arms to angularly adjust the second arm relative to the first arm, the said second arm controlling the adjustment of said auxiliary arm to cause a minute angular displacement thereof relative to the second arm.

3. A device for ascertaining the distance between a point and an object viewed, comprising an arm constituting a side of a triangle formed with the object, a second arm pivoted to the first arm and adjustable relatively thereto at a given ratio, an auxiliary arm also pivoted to the first arm and adjusted angularly when the said second arm is adjusted, a system of light reflection embodying reflecting members carried by the first arm and the auxiliary arm, the reflecting member carried by the auxiliary arm being capable of adjustment to secure coincidence of the images of the object viewed, a sighting instrument coöperating with the reflecting system, the first mentioned arm being provided with a scale decimally divided, a slide embodying pivoted plates engaged with the first and second arms, means carried by the slide for shifting the arms therein, whereby when the slide is adjusted longitudinally the pivoted arms will be angularly adjusted, whereby their angle of divergence may be varied, said slide having a mark coöperating with the indications of the scale, whereby when coincidence is obtained the distance may be measured on the scale.

4. A telemeter comprising an upper and a lower arm pivotally connected, a light reflecting system including reflecting members carried by the arms, the reflecting member carried by the lower arm being adapted to move with said arm, a telescope for receiving the reflected rays from a distant point, a slide for varying the degree of divergence between the arms as the slide is shifted, the said slide embodying a pair of plates pivotally connected at their centers, the plates having their opposite edges bent in angular direction to overlie the bottom face of the lower arm and the upper face of the upper arm, means carried by the slide for varying the degree of divergence between the arms independent of the movement of the slide, a scale extending longitudinally on the upper arm, and an indicator carried by the upper plate and adapted to coöperate with the scale to indicate the distance to be measured.

5. A telemeter comprising a pair of arms pivotally connected, a light reflecting system including reflecting members carried by the arms, the reflecting member carried by one arm being movable therewith, a telescope for receiving the reflected rays from a distant point, a slide for varying the degree of divergence between the arms as the slide is shifted, the said slide embodying a pair of plates pivotally connected at their centers, the opposite edges of said plates being bent in angular directions to overlie the bottom face of the lower arm and the upper face of the upper arm, means carried by the slide for varying the degree of divergence between the arms independent of the movement of the slide, a second slide slidable on the lower arm, means connecting the said second slide with a depending arm on the first slide for adjusting the slides relative to each other, a scale on the upper arm, the first slide being adapted to coöperate with the scale to indicate the distance to be measured when coincidence is effected.

6. In a telemeter, an upper and a lower arm pivotally connected, a light reflecting system including reflecting members carried by said arms, the reflecting member carried by the lower arm being adapted to move with said arm, and a slide for varying the degree of divergence between the arms as the slide is shifted along the arms to secure coincidence of the images of the objects viewed, the said slide comprising upper and lower plates pivoted together at the center and having angular ends to overlap the bottom face of the lower arm and the upper face of the upper arm, an indicator carried by the upper plate and extending over one edge of the upper arm, a scale arranged longitudinally on the upper arm adjacent one edge and with which the said indicator coöperates, springs secured to the angular ends of the plates and engaging the edges of the arms to normally move the same into alinement, clamping jaws mounted in the opposite portions of the plates and adapted to engage the opposite edges of the arms, and means for adjusting the clamping jaws against the action of the springs to move the arms out of alinement independent of the movement of the slide along the arms.

7. A device for ascertaining the distance between a point and an object viewed, comprising pivoted arms, one arm of which constitutes the side of a triangle formed with the object, a system of light reflection embodying reflecting members carried by the arms, one of said arms and the reflecting member carried thereby being capable of adjustment to secure coincidence of images of the objects viewed, a member pivoted to the first arm and acting on said second arm to cause minute angular displacement thereof, means for causing greater angular displacement of said member, said angular displacements or angles being of constant ratio, and a scale for indicating the said angular displacements or angles in terms of distance.

8. A telemeter, comprising an arm constituting a side of a triangle formed with the object viewed, an auxiliary arm pivoted at one end to said first arm at a point adjacent one end of said arm, reflecting members carried by the said arms, the reflecting member carried by the auxiliary arm being at its pivoted end, and another arm pivoted to the first arm at a point more distant from its end than the pivot of the auxiliary arm and adapted to be displaced angularly relative to the first arm, the free extremity of the auxiliary arm being engaged by the last mentioned arm at a point adjacent its pivoted end, whereby the displacement of said arm relative to the first arm, causes a minute angular displacement of the auxiliary arm and the reflector carried thereby.

9. A telemeter, comprising an arm constituting a side of a triangle formed with the object viewed, a second arm pivoted to the first arm, an auxiliary arm pivoted at one end to the first arm adjacent one end of the latter, reflecting members carried by the first arm and the auxiliary arm, the reflecting member carried by the auxiliary arm being capable of adjustment with said arm to secure coincidence of the images of the object viewed, said second arm being pivoted to the first arm at a greater distance from its end than the pivot of the auxiliary arm and capable of being displaced angularly relative to the first arm, the free end of the auxiliary arm extending a short distance beyond the pivoted end of said second arm, means for holding the free end of the auxiliary arm in engagement with said second arm, and means for displacing the said second arm relative to the first arm to cause a minute angular displacement of the auxiliary arm and its reflector.

10. A telemeter comprising two arms pivotally connected, a light reflecting system including reflecting members carried by the arms, the reflecting member carried by one arm being adapted to move with said arm to secure coincidence of the images of the object viewed, a slide for varying the degree of divergence between the arms as the slide is shifted, the said slide embodying a pair of plates pivotally connected at their centers, the plates having their opposite edges arranged to engage the said arms, means carried by the slide for varying the degree of divergence between the arms independent of the movement of the slide, a scale on one of said arms, and an indicator carried by one of said plates and coöperating with the scale to indicate the distance to be measured.

In testimony whereof I have signed my name to this specification in the presence of two subscribing witnesses.

FRANK N. JOHNSON.

Witnesses:
 H. B. COOK,
 V. O. WELLS.

Copies of this patent may be obtained for five cents each, by addressing the "Commissioner of Patents, Washington, D. C."